US009532099B2

(12) United States Patent
Lawrence et al.

(10) Patent No.: US 9,532,099 B2
(45) Date of Patent: Dec. 27, 2016

(54) DISTRIBUTED MEDIA STREAM SYNCHRONIZATION CONTROL

(71) Applicant: Intel Corporation, Santa Clara, CA (US)

(72) Inventors: Sean J. Lawrence, Bangalore (IN); Raghavendra Angadimani, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/667,525

(22) Filed: Mar. 24, 2015

(65) Prior Publication Data

US 2016/0286260 A1    Sep. 29, 2016

(51) Int. Cl.
*H04N 9/475* (2006.01)
*H04N 21/43* (2011.01)
(Continued)

(52) U.S. Cl.
CPC ............ *H04N 21/4307* (2013.01); *H04N 5/04* (2013.01); *H04N 21/436* (2013.01)

(58) Field of Classification Search
CPC ............ H04N 21/4307; H04N 21/2368; H04N 21/4341; H04N 9/8063; H04N 5/04; H04N 21/4305
(Continued)

(56) References Cited

U.S. PATENT DOCUMENTS 5,781,196 A    7/1998 Streater
6,108,447 A    8/2000 Lord et al.
(Continued)

FOREIGN PATENT DOCUMENTS

WO    2012106644    8/2012

OTHER PUBLICATIONS

Bhowmik et al., "System-Level Display Power Reduction Technologies for Portable Computing and Communications Devices", Portable Information Devices, 2007. PORTABLE07. IEEE International Conference, Found at: http://www.ruf.rice.edu/~mobile/elec518/readings/display/intel07.pdf (5 pages).

(Continued)

*Primary Examiner* — Sherrie Hsia
(74) *Attorney, Agent, or Firm* — Green, Howard & Mughal, LLP

(57) ABSTRACT

One or more system, apparatus, method, and computer readable media is described below for wireless display synchronization of audio and video data streams received through a direct wireless link between a content source and sink. In some embodiments, the presentation time stamp (PTS) associated with the encoding of a digital audio and digital video data stream into a compressed packetized data stream at the source is utilized as a control point for synchronization of the digital audio and video stream payloads presented at the sink. In some embodiments, one or more wireless display-synchronized PTS values are determined based on a feedback signal indicative of display synchronization error. A source including an optical camera may generate audio/video (A/V) streams that encoded and packetized by a multiplexer with wireless display-synchronized PTS values. In further embodiments, a media sync user input interface is provided at one or more of the source and sink.

22 Claims, 10 Drawing Sheets

(51) Int. Cl.
*H04N 5/04* (2006.01)
*H04N 21/436* (2011.01)

(58) Field of Classification Search
USPC ............... 348/515, 512, 500, 464, 473, 476
IPC ..................................... H04N 9/475,5/04, 7/00
See application file for complete search history.

(56) References Cited

U.S. PATENT DOCUMENTS

| | | |
|---|---|---|
| 6,256,413 B1 | 7/2001 | Hirabayashi |
| 8,964,830 B2 | 2/2015 | Perlman et al. |
| 2002/0101442 A1 | 8/2002 | Costanzo et al. |
| 2002/0126130 A1 | 9/2002 | Yourlo et al. |
| 2003/0161398 A1 | 8/2003 | Feder et al. |
| 2007/0242129 A1 | 10/2007 | Ferren et al. |
| 2008/0174612 A1 | 7/2008 | Someya et al. |
| 2008/0214239 A1 | 9/2008 | Hashimoto et al. |
| 2009/0009461 A1 | 1/2009 | Chia et al. |
| 2010/0085489 A1 | 4/2010 | Hagemeier et al. |
| 2012/0013746 A1* | 1/2012 | Chen .................... G11B 27/034 348/180 |
| 2012/0075334 A1 | 3/2012 | Pourbigharaz et al. |
| 2012/0183039 A1 | 7/2012 | Rajamani et al. |
| 2014/0281896 A1 | 9/2014 | Wiitala et al. |
| 2015/0067186 A1* | 3/2015 | Kuhn .................... H04L 65/607 709/231 |
| 2015/0348509 A1 | 12/2015 | Verbeure et al. |

OTHER PUBLICATIONS

Barile, "Intel WiDi Technology: Technical Overview Enabling Dual Screen Apps", Apr. 2-3, 2014, https://intel.lanyonevents.com/sz14/connect/sessionDetail.ww?SESSION_ID=1204 (66 pages).

Wi-Fi Alliance, Wi-Fi Display, Technical Specification, Version 1.0.0, Copyright 2012, Wi-Fi Alliance® Technical Committee, Wi-Fi Display Technical Task Group (151 pages).

Non-Final Office Action, mailed Jun. 24, 2016, for U.S. Appl. No. 14/661,991.

International Search Report and Written Opinion for International Patent Application No. PCT/US2016/018319, mailed on Jul. 13, 2016.

* cited by examiner

DISTRIBUTED MEDIA STREAM SYNCHRONIZATION CONTROL

BACKGROUND

With the increase in mobile devices and the prevalence of wireless networking, wireless display capability is experiencing rapid growth. In wireless display technology, a wireless link between a source device and sink display device replaces the typical data cable between computer and monitor. Wireless display protocols are typically peer-to-peer or "direct" and most usage models have a mobile device transmitting media content to be received and displayed by one or more external monitors. In a typical screencasting application for example, a smartphone may be wirelessly coupled to one or more external monitors, display panels, televisions, projectors, etc.

Wireless display specifications (e.g., WiDi v3.5 by Intel Corporation, and Wi-Fi Display v1.0 or WFD from the Miracast program of the Wi-Fi Alliance) have been developed for the transmission of compressed video data and audio data streams over wireless local area networks of sufficient bandwidth. For example, current wireless display technologies utilizing WiFi technology (e.g., 2.4 GHz and 5 GHz radio bands) are capable of streaming encoded full HD video data as well as high fidelity audio data (e.g., 5.1 surround).

For both wireless and wired transmission of media content, the timing of the rendered video signal may deviate from the timing of the rendered audio signal as the video and audio data are decoded and rendered by a receiving display (sink) device. This timing difference or mismatch is commonly known as "lip sync" error, because the error is most readily apparent to the wireless display user when the content represents a person speaking. Lip sync error may be quantified as amount of time audio departs from perfect synchronization with the video where a positive time number indicates the audio leads the video and a negative number indicates the audio lags the video. Lip sync error may vary over time, occurring for example when an A/V stream is corrupted during transmission. Lip sync error of between 50 millisecond and a few seconds are not uncommon.

Certain wired media content receivers, for example complying with a High Definition Media Interface (HDMI) standard (e.g., 2.0 released on Sep. 4, 2013), include a Lip Sync function by which audio processing time may be adjusted automatically to remove errors in audio/video timing. To date however, wireless display technology lacks the capability to sufficiently address lip sync issues.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
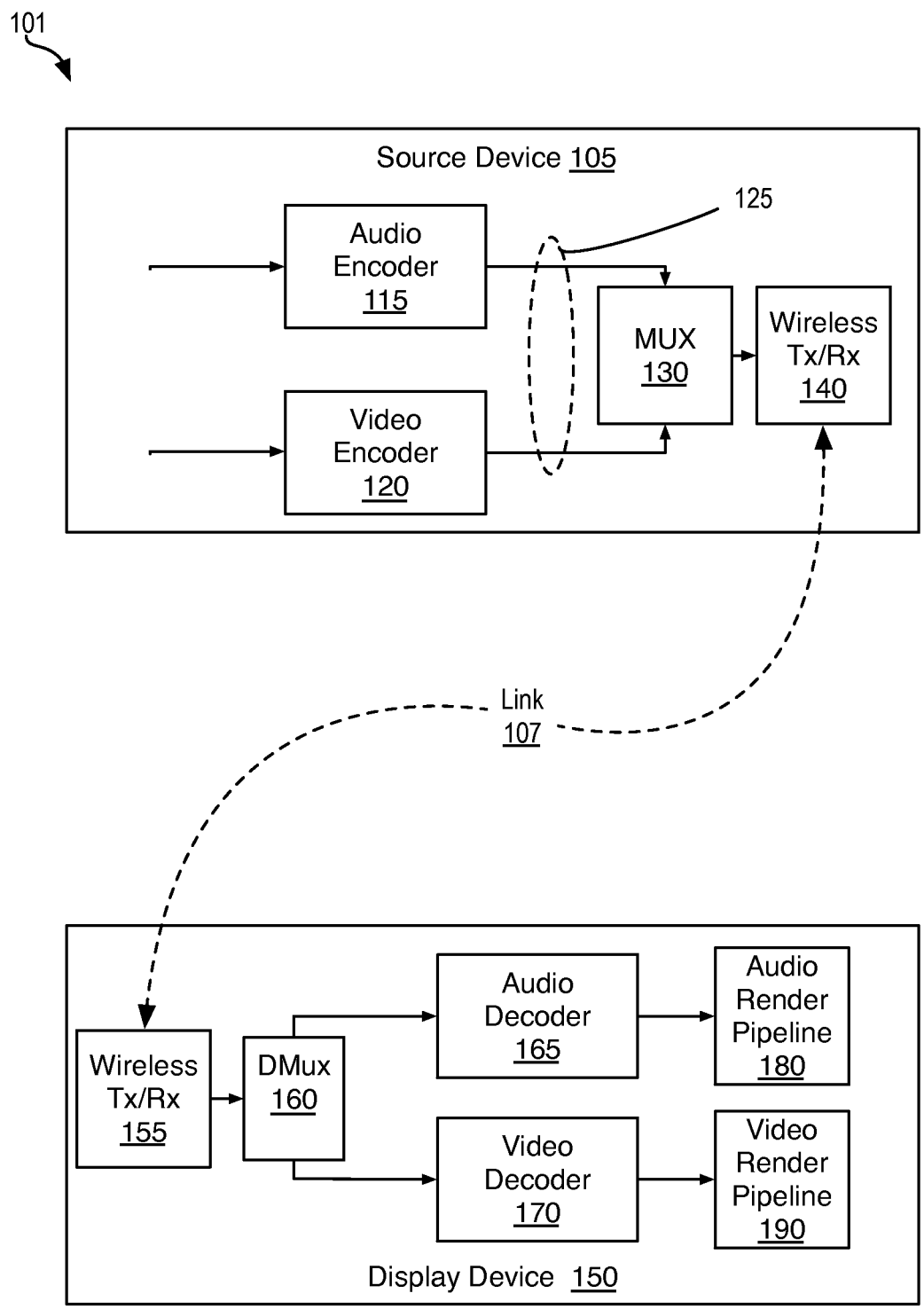
FIG. 1 is a schematic depicting a wireless display system including synchronization control, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Exemplary systems, methods, and computer readable media are described below for wireless display synchronization (sync) of audio and video data streams received through a direct wireless link between a content source and sink. In some embodiments, the presentation time stamp (PTS) associated with the encoding of a digital audio and digital video data stream into a compressed packetized data stream at the source is utilized as a control point for synchronization of the digital audio and video stream payloads presented at the sink. With the presentation time synchronization control effort exerted at the source device, a receiving device need only be compliant with standardized codecs, enabling a display to be "dumb" with respect to presentation synchronization adjustment algorithms.

In some embodiments, one or more feedback signals indicative of display sync error are received and mapped to one or more PTS adjustment values, which are applied to one or more reference PTS values to arrive at one or more wireless display-synchronized PTS values. In some embodiments, a source including an optical camera generates audio/video (A/V) streams that are input to an encoder that compresses the A/V streams. A multiplexer packetizes the compressed A/V streams into a container including wireless display-synchronized PTS values. In further embodiments, a media synchronization user input interface is provided at one or more of the source and sink through which a feedback signal indicative of display sync error for a given transmission may be received.

FIG. 1 is a schematic depicting a wireless display system including A/V stream synchronization control, in accordance with some embodiments. The system includes an A/V source device 105 directly coupled, or "paired," to an A/V display (sink) device 150 through a network link 107. In the exemplary embodiment link 107 is a wireless link, however link 107 may be wired in some alternative embodiments. Source device 105 may be any device operable to set audio and video presentation times. In the illustrative embodiment, A/V source device 105 includes an audio encoder 115 and video encoder 120. Encoders 115, 120 are to receive digital audio data and digital video data inputs, respectively. Any upstream source may provide these inputs. Encoders 115, 120 are to output a raw compressed (coded) digital audio data stream and digital video data stream, respectively, as a representation of the inputs. Encoders 115, 120 may implement any codec known to perform one or more of transformation, quantization, motion compensated prediction, loop filtering, etc. In some embodiments, audio encoder 120 complies with one or more linear pulse code modulation (LPCM) specification, such as but not limited to, Digital Dolby AC-3, Dolby TrueHD, or Advanced Audio Coding (AAC). In some embodiments, video encoder 120 complies with one or more specification maintained by the Motion Picture Experts Group (MPEG), such as, but not limited to, MPEG-1 (1993), MPEG-2 (1995), MPEG-4 (1998), and associated International Organization for Standardization/International Electrotechnical Commission (ISO/IEC) specifications. In some exemplary embodiments, encoders 115, 120 comply with one or more of H.264/MPEG-4 AVC standard, HEVC standard, VP8 standard, VP9 standard specifications.

A/V source device 105 further includes multiplexer 130 to multiplex the coded elementary streams into a higher-level packetized stream that further includes a metadata field specifying a presentation synchronization of the elementary stream packets. In some embodiments, multiplexer 130 codes the packetized elementary streams into an MPEG program stream (MPS), or more advantageously, into an MPEG transport stream (MTS). A presentation timestamp (PTS) may be assigned in the PES packet layer and utilized by a receiving device to set the presentation time of a given video slice and audio slice. In further embodiments, the MTS is encapsulated following one or more of Real-Time Protocol (RTP), user datagram Protocol (UDP) and Internet Protocol (IP) as embodiments are not limited in this context. In some RTP embodiments for example, a Network Abstraction Layer (NAL) encoder (not depicted) receives the MTS and generates Network Abstraction Layer Units (NAL units) that are suitable for wireless transmission. While exemplary embodiments described in detail herein make reference to "PTS", metadata fields of a different name but nonetheless utilized to set the presentation time may be similarly utilized. For example, where an RTP payload is a PES rather than a MTS, the RTP timestamp may serve to set the presentation time of a given video frame.

In the exemplary embodiments, an A/V source device further includes a wireless transmitter (Tx) coupled to receive the coded stream data and output a wireless signal representative of the coded stream data directly to a sink device. In the exemplary embodiment illustrated in FIG. 1, A/V source device 105 includes a wireless transceiver (Tx/Rx) coupled to an output of multiplexer 130. Wireless transceiver 105 may utilize any band known to be suitable for the purpose of directly conveying (e.g., peer-to-peer) the stream data for real time presentation on a sink device. In some embodiments, wireless transceiver 105 is operable in the 2.4 GHz and/or 5 GHz band (e.g., Wi-Fi 802.11n). In some embodiments, wireless transceiver is operable in the 60 GHz band. Wireless transceiver 105 may further support and/or comply with one or more High Definition Media Interface (HDMI) protocol, such as, but not limited to Wireless Home Digital Interface (WHDI), Wireless Display (WiDi), Wi-Fi Direct, Miracast, WirelessHD, or Wireless Gigabit Alliance (WiGig) certification programs.

As further illustrated in FIG. 1, A/V display device 150 is communicatively coupled to A/V source device 105 through wireless transceiver 155 during a wireless streaming session. Wireless transceiver 155 may utilize any frequency band and wireless communication protocol compatible with that of transceiver 140. An output from wireless transceiver 155 is coupled to an input of de-multiplexer 160, which is to process the encapsulated packetized streams into compressed data inputs passed to audio decoder 165 and video decoder 170. De-multiplexer 160 includes logic to unencapsulate and extract audio and video payloads from the packetized A/V stream. In exemplary embodiments, de-multiplexer 160 includes logic to de-multiplex the packet payloads based, at least in part on the metadata field specifying the presentation synchronization of the elementary stream packets (e.g., PTS). Decoders 165, 170 may utilize any codec compatible with that of encoders 115, 120 to generate representations of digital audio data and digital video data that are input to audio rendering pipeline 180 and video rendering pipeline 190, respectively. Audio rendering pipeline 180 terminates at one or more audio speaker, while video rendering pipeline 190 terminates at one or more display (screen). Any known audio and image processing may be employed within pipelines 180, 190 as embodiments are not limited in this context.

End-to-end synchronization for system 101 occurs when presentation timestamps at the output of encoders 115, 120 propagate to decoders 165, 170, and when decoders use those time stamps to schedule presentations by A/V display device 150. A/V source device 105 includes a control point 125 for synchronization of the digital audio and video streams presented at display device 150. In some embodiments, control point 125 utilizes the metadata field specifying presentation synchronization (e.g. PTS). This field is to be modified from a native, or reference value, determined in the absence of any control effort applied at control point 125. The PTS is to be determined or adjusted at A/V source device 105 as a function of a wireless display synchronization control signal indicative of an A/V presentation synchronization error perceived or determined based on output of A/V display device 150. The PTS assigned to packets in accordance with some embodiments herein may be referred to as "presentation feedback-synchronized," or "display-synchronized" because the relative presentation time at the source device is adjusted to counter a PTS sync offset value perceived in real time at the display device. As described further below, the wireless display synchronization control signal may originate from any of a user interaction with A/V source device 105, a user interaction with A/V display device 150 that is relayed back to A/V source device 105, or an automated A/V synchronization error determination at A/V display device 150.

Figure 2A:
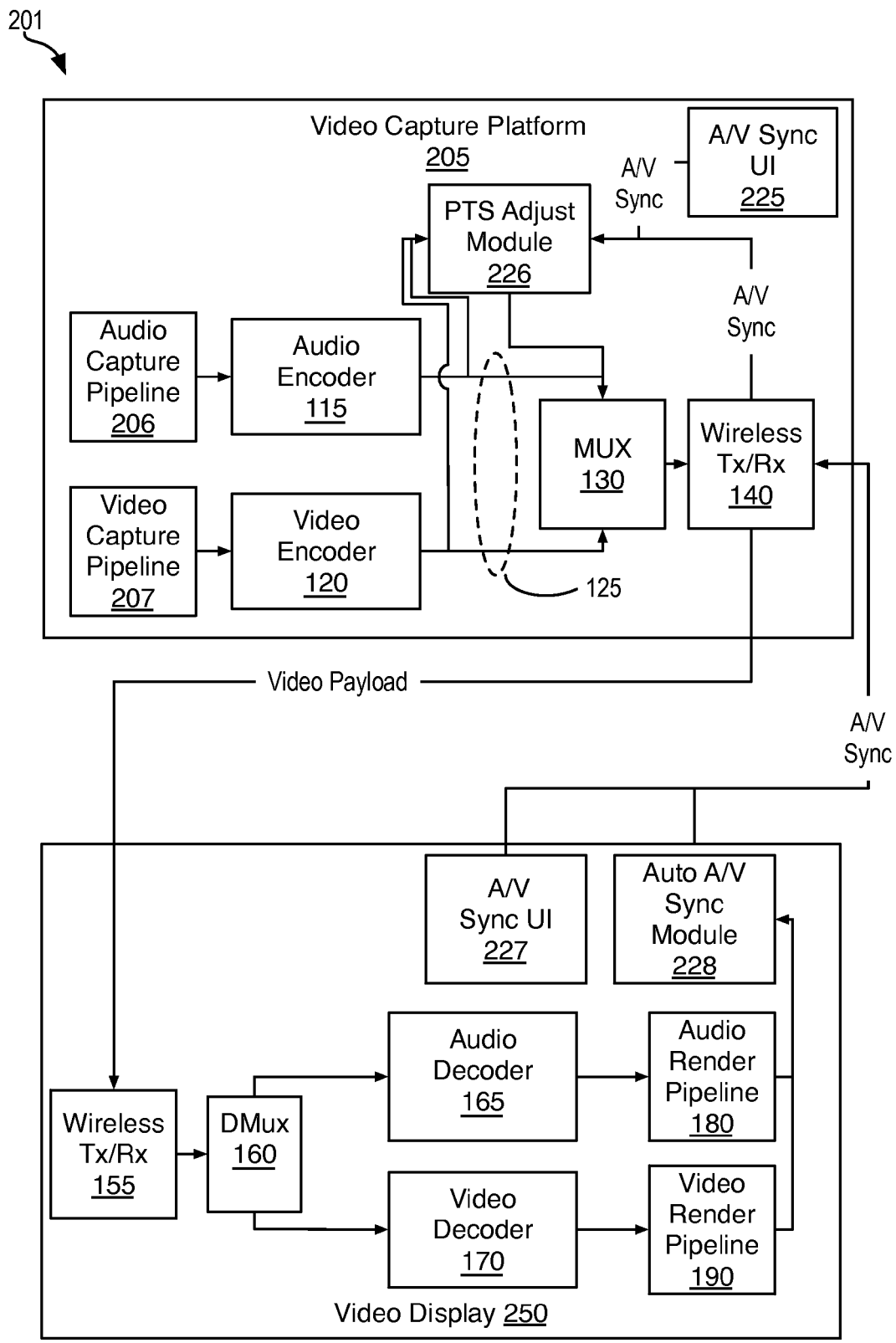
FIG. 2A is a schematic depicting a wireless display system including a video capture platform with wireless display synchronization control, in accordance with some embodiments.
Figure 2B:
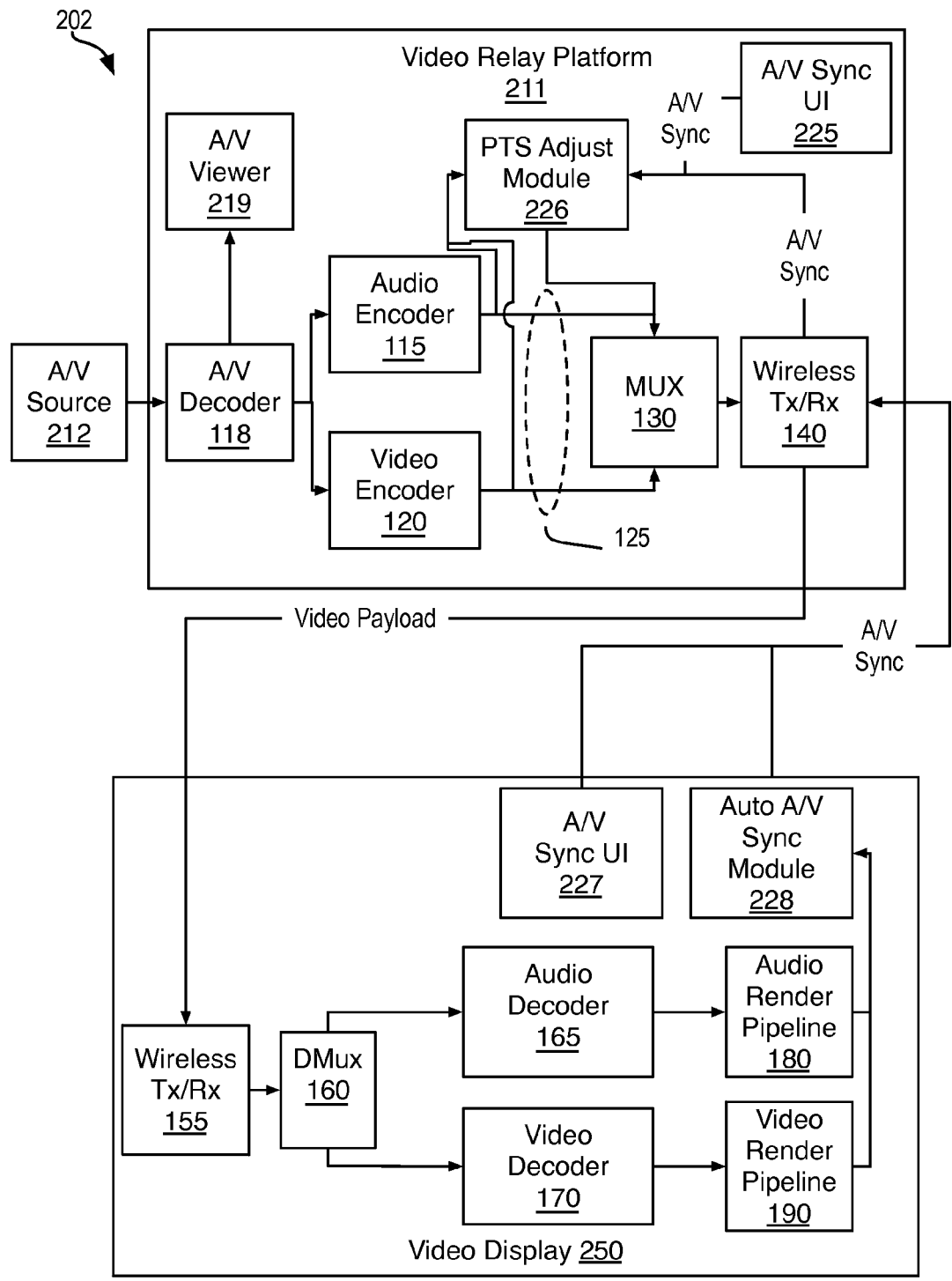
FIG. 2B is a schematic depicting a wireless display system including a video relay platform with wireless display synchronization control, in accordance with some embodiments.

System 101 may be implemented with various network topologies and use models. In some embodiments for example, a source includes a video camera (e.g., a camera communication, or "CamCom" platform). Packetization of the audio and video streams output by a camera module are based, at least in part, on the feedback signal indicative of an A/V presentation synchronization error perceived on a directly coupled A/V display device. FIG. 2A is a schematic depicting a wireless CamCom display system 201, which could be deployed in surveillance or virtual video conferencing applications, for example. In system 201, video capture platform 205 records video of a subject (e.g., the user of the video capture platform 205). Recorded video is wirelessly transmitted to video display 250, which may be located in a conference room proximal to an office of the user of video capture platform 205, for example. In other embodiments, a wireless display source device transcodes an A/V stream received from an upstream content source. With this topology, the source device is to packetize the re-coded audio and video streams based, at least in part, on a feedback signal indicative of an A/V presentation synchronization error perceived or determined at a paired A/V display device. FIG. 2B is a schematic depicting one example where a wireless relayed video display system 202 is deployed in a content mirroring application. In system 202, video relay platform 211 transcodes received video content into a format compatible with wireless transmission to video display 250, such as a large format display within the field of view of a user of platform 211.

Referring further to FIG. 2A, video capture platform 205 includes wireless display synchronization control, in accordance with some embodiments. In video capture platform 205, the presentation time for audio and/or video packets is adjusted based on a known A/V sync loss. An audio capture pipeline 206, including for example a microphone, is coupled to an input of audio encoder 115. An input of video encoder 120A is coupled to an output of video capture pipeline 207, which may include any known image sensor outputting time sequential frames of image data at some predetermined frame rate. Encoders 115, 120 output coded bit streams for packetization. A native presentation time stamp (value) is determined at a packetization level using any known techniques. A presentation timestamp adjustment module 226 receives an A/V synchronization signal indicative of a presentation time synchronization error perceived or determined at A/V display 250.

Figure 4A:
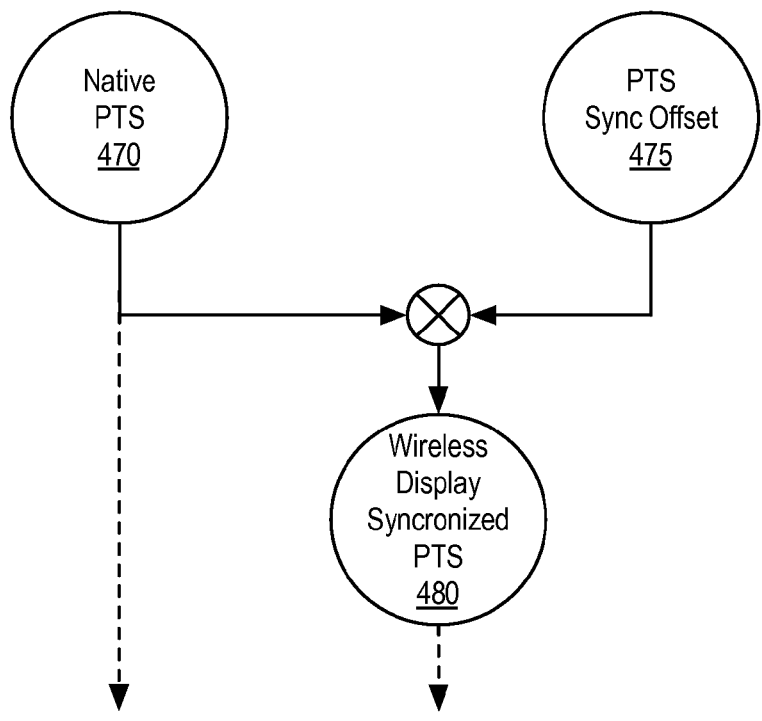
FIG. 4A is a flow diagram illustrating a method of synchronizing encoded audio and video streams, in accordance with some embodiments.
Figure 4B:
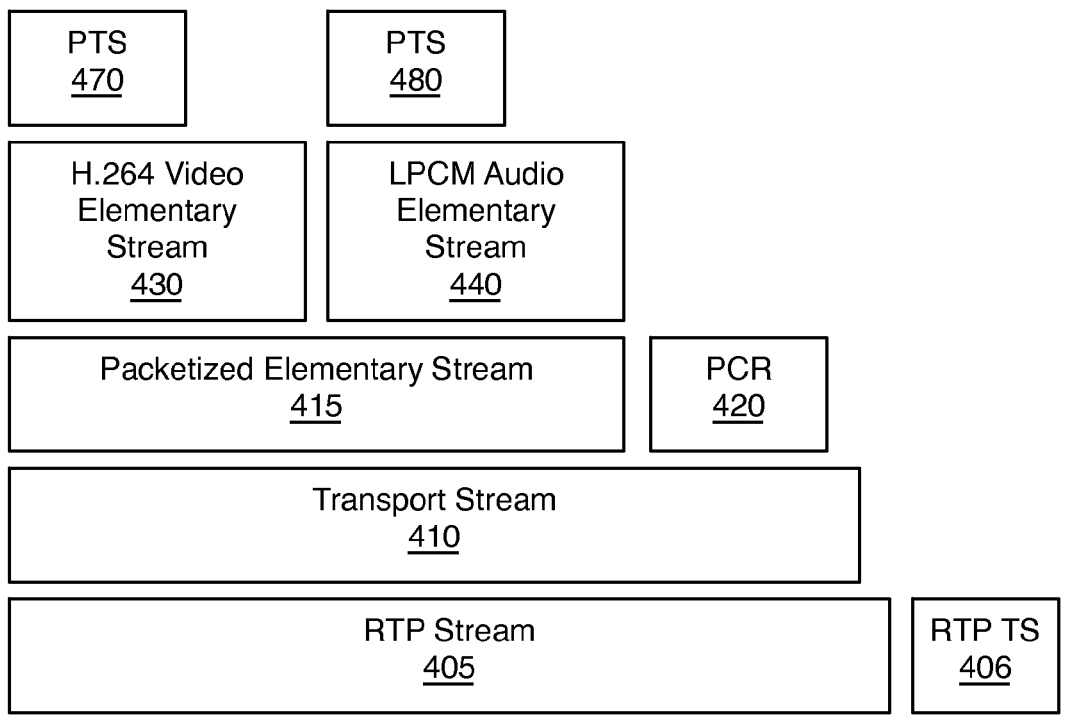
FIG. 4B is a schematic illustrating a digital audio and video content packet structure, in accordance with some embodiments.

As further illustrated in FIG. 4A, in some embodiments a PTS adjustment module is to receive a native PTS value 470 and a PTS synchronization offset value 475 as inputs. A feedback synchronized PTS value 480 is output. In some embodiments, a PTS adjustment module may for example add PTS sync offset 475 to a native PTS value 470 associated with one or more payload of a packetized elementary stream. In some embodiments, a wireless display-synchronized PTS value is associated with packets of at least one of an encoded video elementary stream, and an encoded audio elementary stream. FIG. 4B is a schematic illustrating a digital audio and video content packet structure, in accordance with some embodiments. In the illustrated embodiment, native PTS value 470 is associated with one or more packets of H.264 encoded video data stream 430 representing one video frame, while the wireless display-synchronized PTS value 480 is associated with one or more packets of LPCM audio stream 440 corresponding to the video frame encoded into stream 430. Payloads of the packetized elementary streams 415 are combined into payloads associated with one or more program clock reference (PCR) to encode the timing of the transport stream 410. The transport stream packets are further encapsulated in one or more packets of RTP stream 405 as payloads associated with corresponding RTP timestamps 406. In alternative embodiments, native PTS value 470 is instead associated with one or more packets of LPCM audio stream 440 while the wireless display synchronized PTS value 480 is associated with one or more packets of H.264 encoded video data stream 430 representing one video frame. In further embodiments, the encoded video or audio packets are to be delayed by PTS sync offset 475 as a function of perceived audio lag or lead, respectively, in the audio presentation relative to the video presentation. For example, encoded video packets may be delayed by PTS sync offset 475 in response to a sync error signal indicative of audio lag at a display device, while encoded audio packets may be delayed by PTS sync offset 475 in response to a sync error signal indicative of audio lead at a display device.

Figure 5:
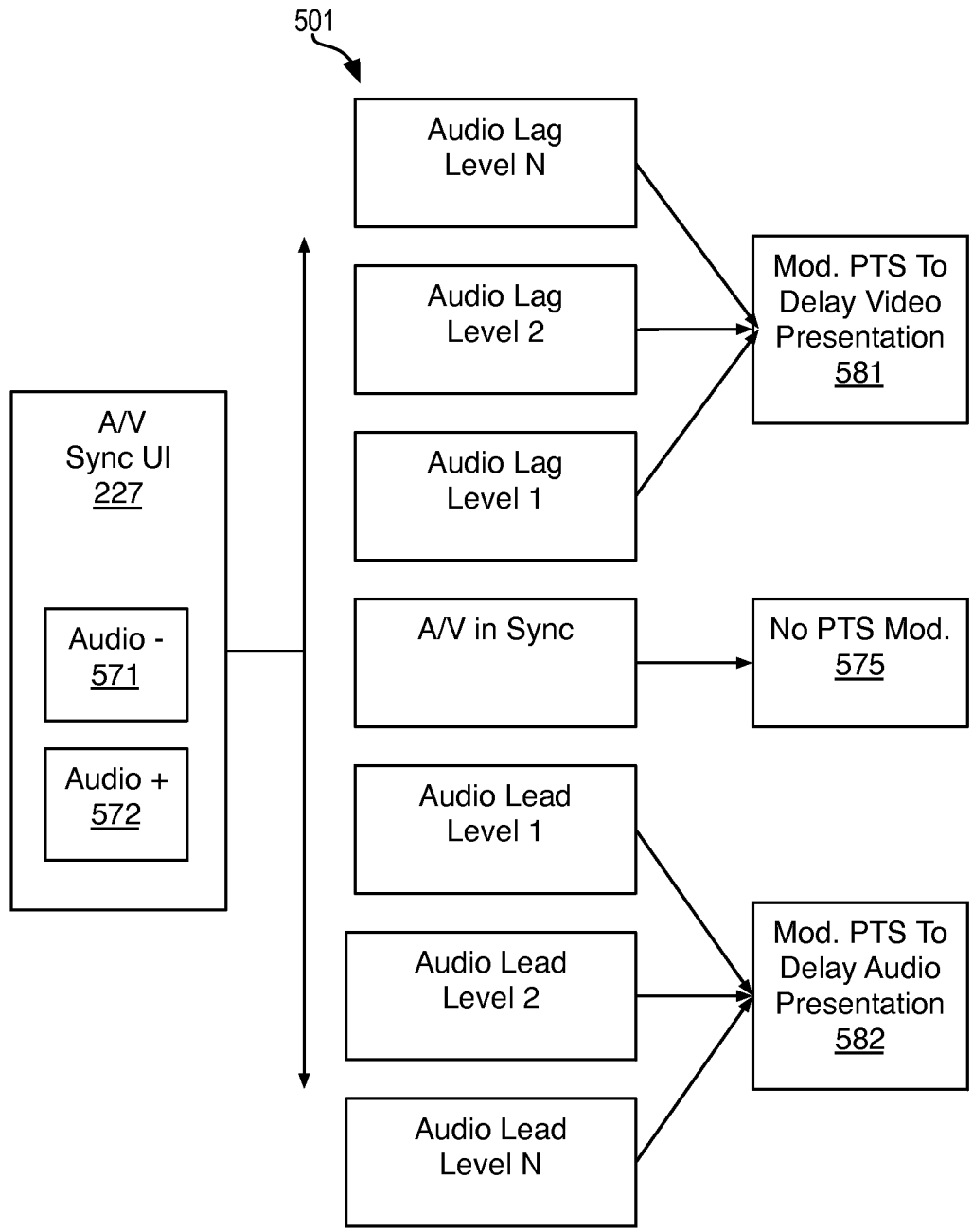
FIG. 5 is schematic illustrating a mapping between a synchronization user input and presentation time stamp modification, in accordance with some embodiments.

In some embodiments, an A/V sync offset value is determined with user input received through a user interface (UI). The user interface is to receive user input in real time during presentation of content received from the source device. A PTS offset value is derived from the user input map, for example by a mapping table or function. The UI for an A/V sync adjustment may take any number of forms, such as, but not limited to, an increment/decrement (+/−) button control. FIG. 5 is schematic illustrating a mapping between an exemplary synchronization user input and presentation time stamp offset, in accordance with some embodiments. The A/V sync UI 227 includes an audio sync "−" control 571 and an audio sync "+" control 572. A sync mapping database 501 maps levels audio lead and audio lag to a PTS modification that may be associated with either the video or data presentation. Entries in the sync mapping database 501 may be traversed as a function of user activation of controls 571, 572. In some embodiments, each entry in the sync mapping database 501 associates an audio lag level with a predetermined PTS sync offset (e.g., 0.25 msec, 50 msec, etc.). Upon an initialization of a content transmission session (e.g., a WFD session), the PTS sync offset is set to a default value of 0, resulting in an operative state 575 in which there is no PTS modification. Upon receiving a user input indicative of a perceived audio lag, the session continues in an operative state 581 where the mapped PTS sync offset is applied to delay the video presentation. Upon receiving a user input indicative of a perceived audio lead, the session continues in an operative state 582 where the mapped PTS sync offset is applied to delay the audio presentation.

In some embodiments, the source device and/or the display device implements an A/V sync UI. Returning FIG. 2A for example, video capture platform 205 may include an A/V sync UI 225. In FIG. 2A, A/V sync UI 225 is denoted with dashed lines to emphasize an A/V sync signal may alternatively be generated as a function of user input through A/V sync UI 227 implemented by display 250. In first embodiments, A/V sync UI 225 is coupled to PTS adjust module 226. PTS sync offsets determined in response to user inputs received in real time with content transmission are output to PTS adjust module 226. In alternative embodiments where a user input is received through A/V sync UI 227, a PTS sync offset (or any signal indicative thereof) is transmitted back to video capture platform 205. In one such embodiment, a back channel maintained during the content streaming session is employed to communicate the PTS sync offset from display 250 to video capture platform 205. In one WiD-compatible embodiment, a PTS sync offset is communicated over the User Input Back Channel (UIBC) maintained between video capture platform 205 (functioning as a WFD Source) and the video display 250 (functioning as the WFD Sink). Under the WiD specification 1.0, the UIBC is available to send control and data information originating with user input at the WFD sink.

In alternative embodiments, an A/V sync offset value is determined automatically at video display 250 based on inputs received from audio render pipeline 180 and/or video render pipeline 190. For such embodiments, automated A/V sync module 228 may implement any known algorithm for detecting and/or quantifying an A/V sync error as embodiments are not limited in this respect.

FIG. 2B depicts a video content relay platform 211 with wireless display synchronization control to illustrate how the components described in the context of FIG. 2A may be applied in alternate topologies and applications, such as screen mirroring. In the illustrated embodiment, relay platform 211 transcodes video content received from an arbitrary upstream A/V source 212. A/V decoder 118 implements a codec compatible with that implemented by A/V source 212 to generate audio and video data streams which are (re)encoded by encoders 115, 120 into a format (e.g., H.264) suitable for direct wireless transmission to video display 250. PTS adjustment module 226 may then apply the presentation synchronization control effort substantially as described above in the context of video capture platform 211. Relayed video transmitted by video relay platform 211 may be re-synchronized with a PTS offset applied as a function of perceived audio lead/lag in output of display 250 substantially as described above in the context of FIG. 2A.

Figure 3:
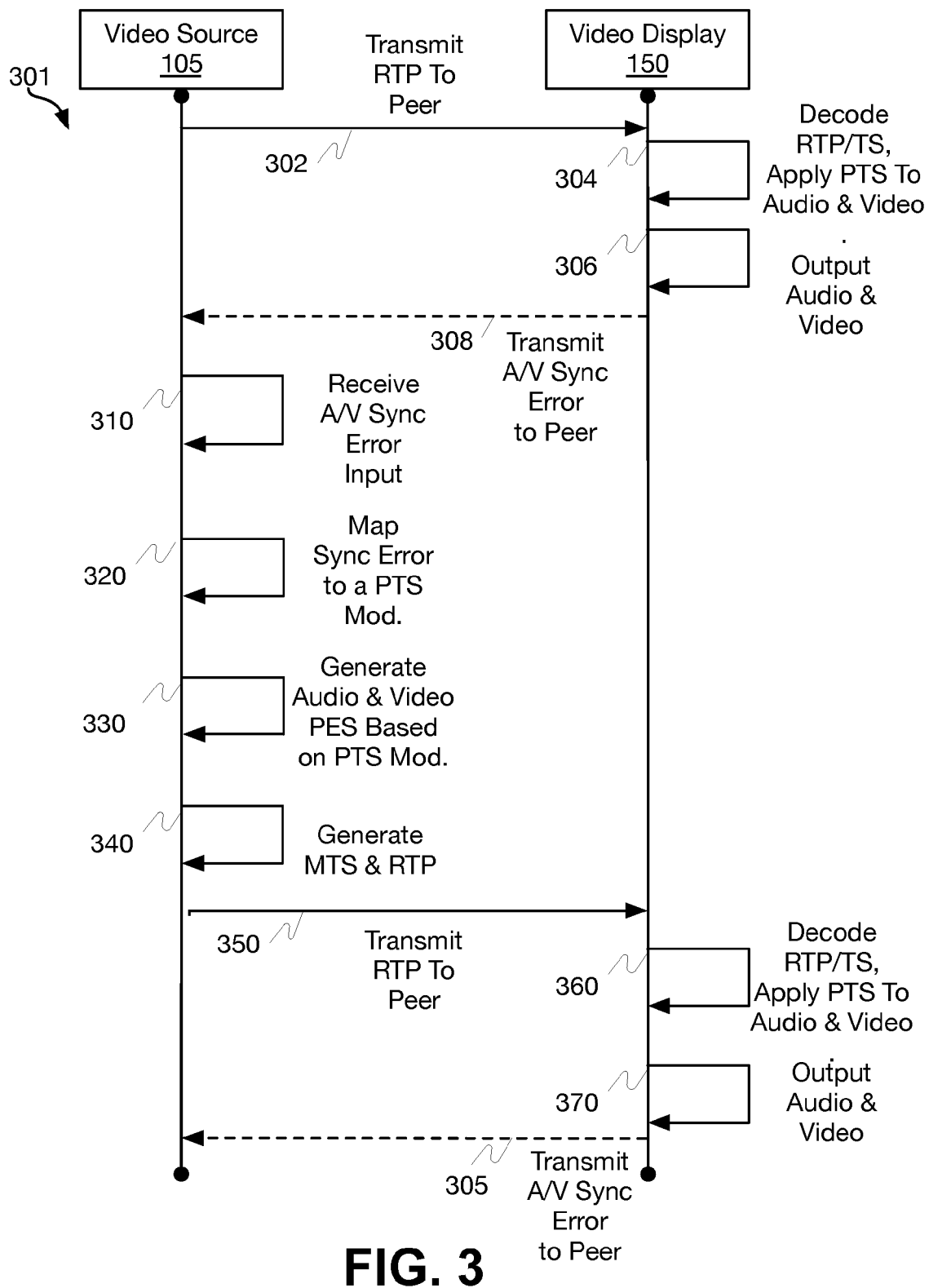
FIG. 3 is a flow diagram depicting a method for wireless display synchronization control, in accordance with some embodiments.

FIG. 3 is a flow diagram depicting a method 301 for wireless display synchronization control, in accordance with some embodiments. Method 301 begins at operation 302 where video source 105 streams packetized (e.g., RTP and TS) and compressed (e.g., H.264) A/V data in real time over a wireless channel to a paired video display 150. At operation 304, video display 150 decodes the encapsulated packets into digital audio and video representations having an associated PTS. In an embodiment, a PTS offset value is zero at operation 304. At operation 306, display 150 outputs the audio and video, for example with audio speakers and a view screen, such as, but not limited to a flat panel display employing liquid crystal display (LCD) technology, and/or light emitting diode (LED) technology. At operation 308, an A/V sync error signal is transmitted from video display 150, for example over a back channel (e.g., UIBC), to video source 105. At operation 310, the video source 105 receives an A/V sync error signal, which in one example is the error signal transmitted at operation 308. At operation 320, video source 105 maps the sync error signal to a presentation timestamp modification that will delay presentation of compressed audio or video being packetized. At operation 330, video source 105 generates audio and video PES. At operation 340, MTS and RTP streams are generated based on the PES and incorporating the modified, wireless display-synchronized, PTS. At operation 350, the RTP stream is transmitted wirelessly to video display 150. At operation 360, video display 150 decodes RTP and TS streams following known techniques. At operation 370, video display 150 presents audio and video based on the wireless display-synchronized PTS. Streaming of content from video source 105 to video display 150 continues with the display-synchronized PTS until the session is closed or another A/V sync error is transmitted to the source peer (another iteration of operations 305).

Figure 6:
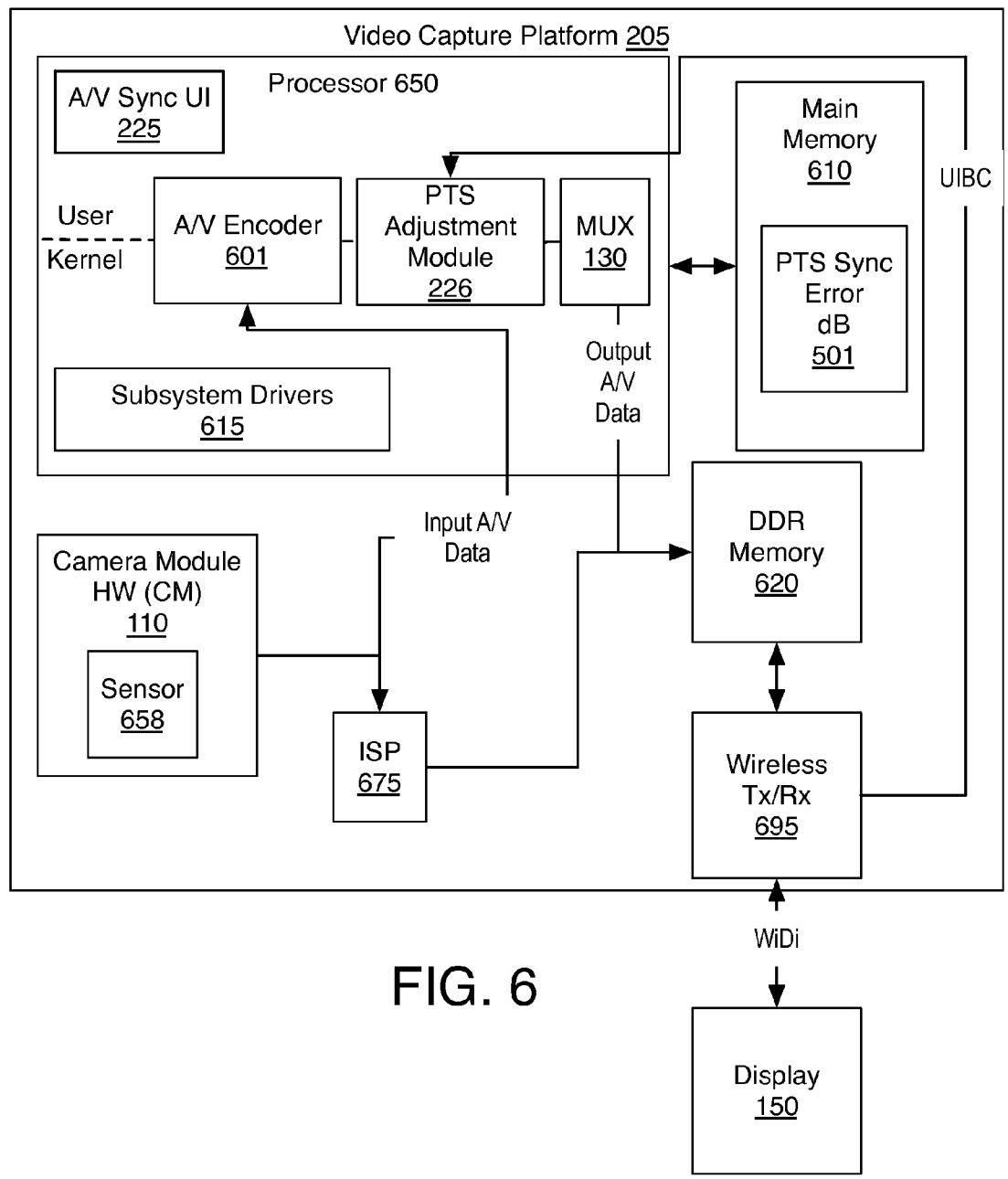
FIG. 6 is a functional block diagram of a video capture device, in accordance with embodiments.

FIG. 6 is a functional block diagram further illustrating video capture platform 205, in accordance with embodiments. Platform 205 includes at least one camera module (CM). In the exemplary embodiment, CM 110 further includes a camera sensor 658. Sensor 658 may be a HD, FHD, QXGA, WQXGA, QSXGA, or UHD format digital optical imaging device, for example. In one embodiment sensor 658 has at least 8-megapixel resolution. Camera sensor 658 may provide a color resolution of 8 bits, or more per pixel, is operable to capture continuous video frames progressively. Sensor 658 may have a pixel frequency of 170 MHz, or more. Camera sensor 658 may include an RGB Bayer color filter, an analog amplifier, an A/D converter, other components to convert incident light into a digital signal corresponding to raw image data. Sensor 658 may be controlled to operate a rolling shutter or electronic focal plane shutter process where pixels are read out progressively in a line-sequential fashion for a frame. In exemplary video embodiments, sensor 658 outputs multiple consecutively exposed frames. CM 110 may output raw data associated with the consecutively sampled frames in conformance with any known streaming protocol, such as a MIPI. Raw image data is input to ISP 675. ISP 675 is to receive and analyze raw image data during the horizontal and/or vertical blanking periods associated with CM 110. During raw image data processing, ISP 675 may perform one or more of color space conversion, noise reduction, pixel linearization, and shading compensation, for example.

Raw data output by CM 110 and/or pre-processed video data output by ISP 675 may be further processed into a compressed form by A/V encoder 601. In some embodiments, A/V encoder 601 further includes audio encoder 115 and video encoder 120 described elsewhere herein. In embodiments, A/V encoder 601 includes logic to perform the encoding and packetization operations and algorithms described elsewhere herein. In further embodiments, PTS adjustment module 226 includes logic to perform one or more modification to presentation timestamps assigned to packets of encoded audio or video. In some embodiments, A/V encoder 602 and PTS adjustment module 226 may be configured through software instruction(s).

PTS modifications based on a feedback signal indicative of a sync error perceived at a wireless display may be implemented through either software or hardware, or with a combination of both software and hardware. For pure hardware implementations, A/V encoder 601 and/or PTS adjustment module 226 may be implemented by fixed function logic, for example provided in ISP 675. For software implementations, any known programmable processor, such as a core of processor 650, or an execution unit of a graphics processor, may be utilized to implement the logic of A/V encoder 601 and/or PTS adjustment module 226. In the illustrated embodiment, A/V encoder 601, PTS adjustment module 226, and multiplexer 130 are implemented in software instantiated in a user or kernel space of processor 650. Alternatively, an ISP 675 having fixed or semi-programmable logic circuitry may implement one or more of the A/V encoder 601, PTS adjustment module 226, or multiplexer 130.

In some embodiments, processor 650 includes one or more (programmable) logic circuits to perform one or more stages of a method for modifying a presentation time of audio and/or video streamed over a real time wireless protocol, such as, but not limited to WFD or WiDi. For example, processor 650 may perform method 301 (FIG. 3) in accordance with some embodiments described above. In some embodiments, processor 650 is to access PTS sync error database 501 stored in main memory 610, and is to determine a PTS modification (e.g., PTS offset value) based on a presentation time synchronization error signal. Processor 650 may be solely responsible for modifying PTS values to synchronize input image data collected by CM 110 or output from ISP 675. In one exemplary embodiment, A/V encoder 601, and/or PTS adjustment module 602, and/or MUX 130, and/or A/V sync UI 225 are invoked through the user space of a software stack instantiated by processor 650. In some embodiments, processor 650 executes one or more video encoding, and/or packetization algorithm in a kernel space of the instantiated software stack. In some embodiments, processor 650 employs a graphics processor driver included in subsystem drivers 615 to cause one or more video encoding algorithm to be executed by a graphic processor (not depicted). In some embodiments, processor 650 is programmed with instructions stored on a computer readable media to cause the processor 650 to perform one or more modification to a presentation time of audio and/or video streamed over a real time wireless protocol.

As further illustrated in FIG. 6, output A/V data streams may be output a wireless transceiver pipeline 695. In one exemplary embodiment, output A/V stream data is buffered by writing the stream data to electronic memory 620 (e.g., DDR, etc.). Memory 620 may be separate or a part of a main memory 610. Wireless transmission pipeline 695 includes a wireless transceiver, for example substantially as described elsewhere herein, to convey (e.g., with a real time protocol) the output A/V data stream to receiving display 150.

Figure 7:
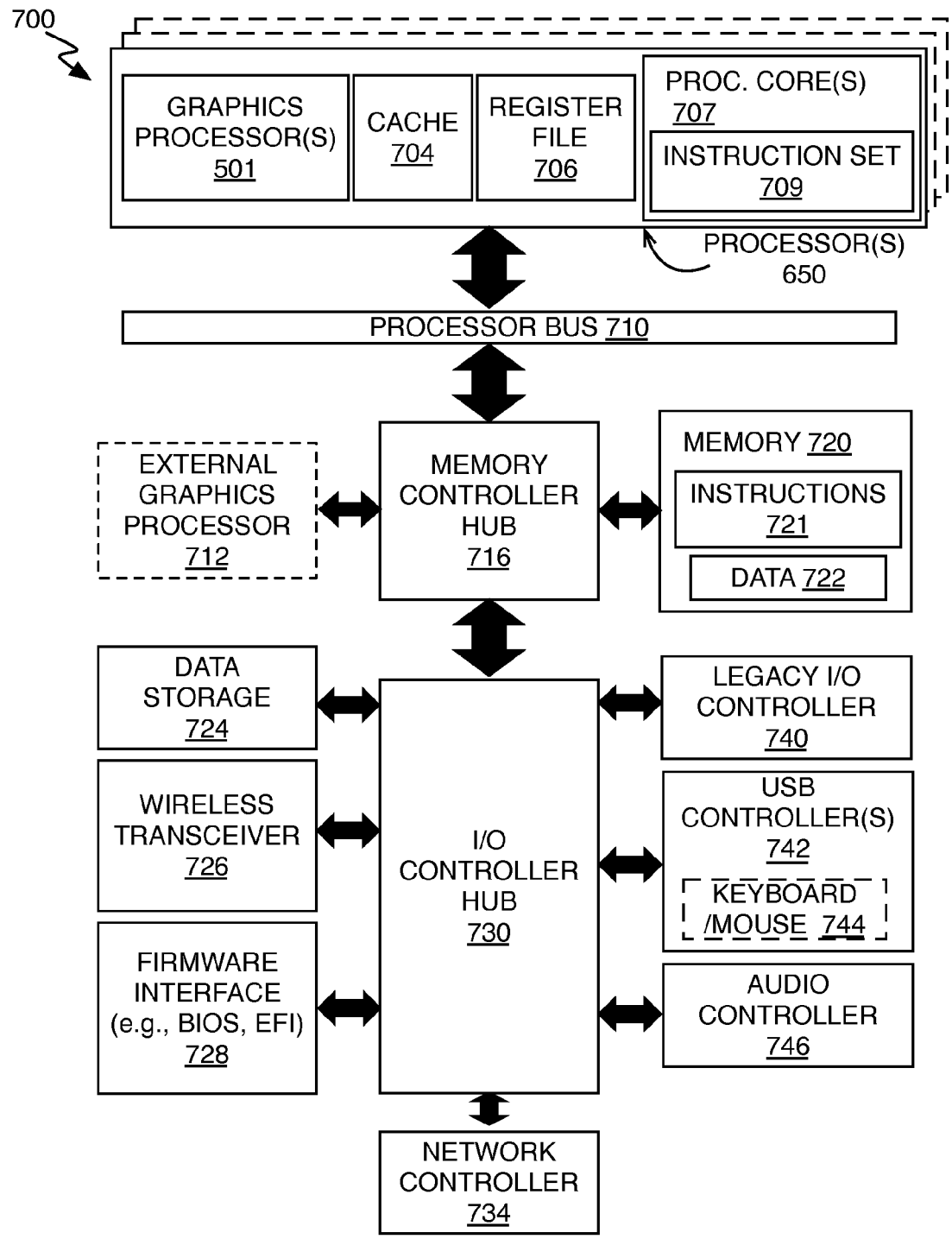
FIG. 7 is a block diagram of a data processing system, in accordance with some embodiments.

FIG. 7 block diagrams a data processing system 700 that may be utilized to encode and packetize video data with one or more display-synchronized PTS values. Data processing system 700 includes one or more processors 650 and one or more graphics processors 708, and may be implemented in a single processor desktop system, a multiprocessor workstation system, or a server system having a large number of processors 650 or processor cores 707. In another embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 650 and a graphical interface generated by one or more graphics processors 708.

In some embodiments, the one or more processors 650 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 650 includes cache memory 704. Depending on the architecture, the processor 650 can have a single internal cache or multiple levels of internal cache. In some embodiments, the cache memory is shared among various components of the processor 650. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 650 which may include different types of registers for storing different types of data (e.g., integer registers, floating point registers, status registers, and an instruction pointer register). Some registers may be general-purpose registers, while other registers may be specific to the design of the processor 650.

In some embodiments, processor 650 is coupled to a processor bus 710 to transmit data signals between processor 650 and other components in system 700. System 700 has a 'hub' system architecture, including a memory controller hub 716 and an input output (I/O) controller hub 730. Memory controller hub 716 facilitates communication between a memory device and other components of system 700, while I/O Controller Hub (ICH) 730 provides connections to I/O devices via a local I/O bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processor 650 executes a process. Memory controller hub 716 also couples with an optional external graphics processor 712, which may communicate with the one or more graphics processors 708 in processors 650 to perform graphics and media operations.

In some embodiments, ICH 730 enables peripherals to connect to memory 720 and processor 650 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
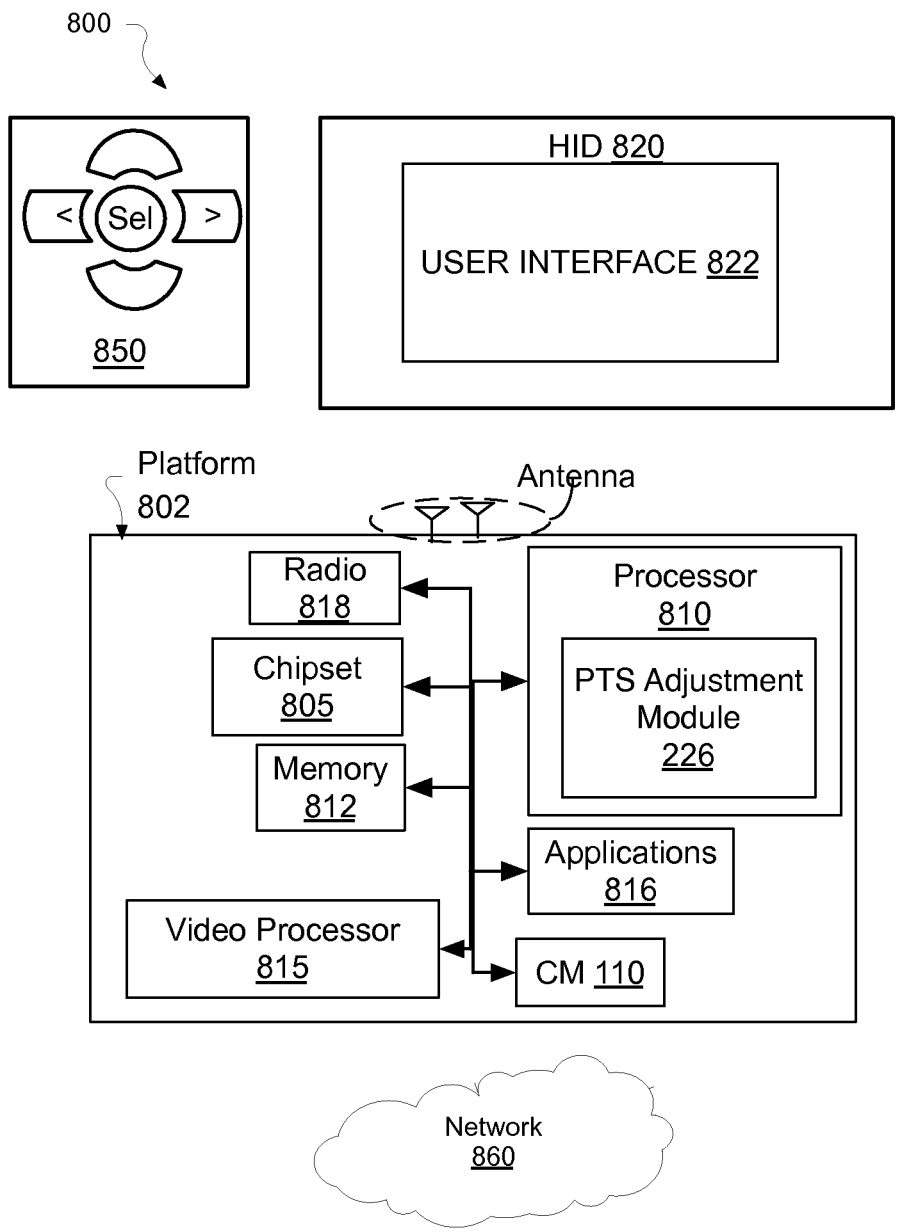
FIG. 8 is a diagram of an exemplary ultra-low power system including a presentation time stamp modification module, in accordance with some embodiments.

FIG. 8 is a diagram of an exemplary ultra-low power system 800 employing an image/video CamCom Tx device, in accordance with one or more embodiment. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internes device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the recoded video encoding, packetization, and wireless transmission methods described above in the context of FIG. 1-6. In various exemplary embodiments, processor 810 executes PTS adjustments, for example as described elsewhere herein. Processor 810 includes logic circuitry implementing PTS adjustment module 226, for example as described elsewhere herein. In some embodiments, one or more computer readable media may store instructions, which when executed by CPU 810 and/or video processor 815, cause the processor(s) to execute one or more of the image data encoding and/or presentation timestamp modification operations described elsewhere herein. One or more image data frames output by CM 110 may then be transmitted by radio 818 in association with a wireless display-synchronized PTS.

In embodiments, device platform 802 is coupled to a human interface device (HID) 820 that may further include a user interface 822. Platform 802 may collect raw image data with CM 110, which is processed and output to HID 820. A navigation controller 850 including one or more navigation features may be used to interact with, for example, device platform 802 and/or HID 820. In embodiments, HID 820 may include any monitor or display coupled to platform 802 via radio 818 and/or network 860. HID 820 may include, for example, a computer display screen, touch screen display, video monitor, television-like device, and/or a television.

In embodiments, device platform 802 may include any combination of CM 110, chipset 805, processors 810, 815, memory/storage 812, applications 816, and/or radio 818. Chipset 805 may provide intercommunication among processors 810, 815, memory 812, video processor 815, applications 816, or radio 818.

One or more of processors 810, 815 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 9:
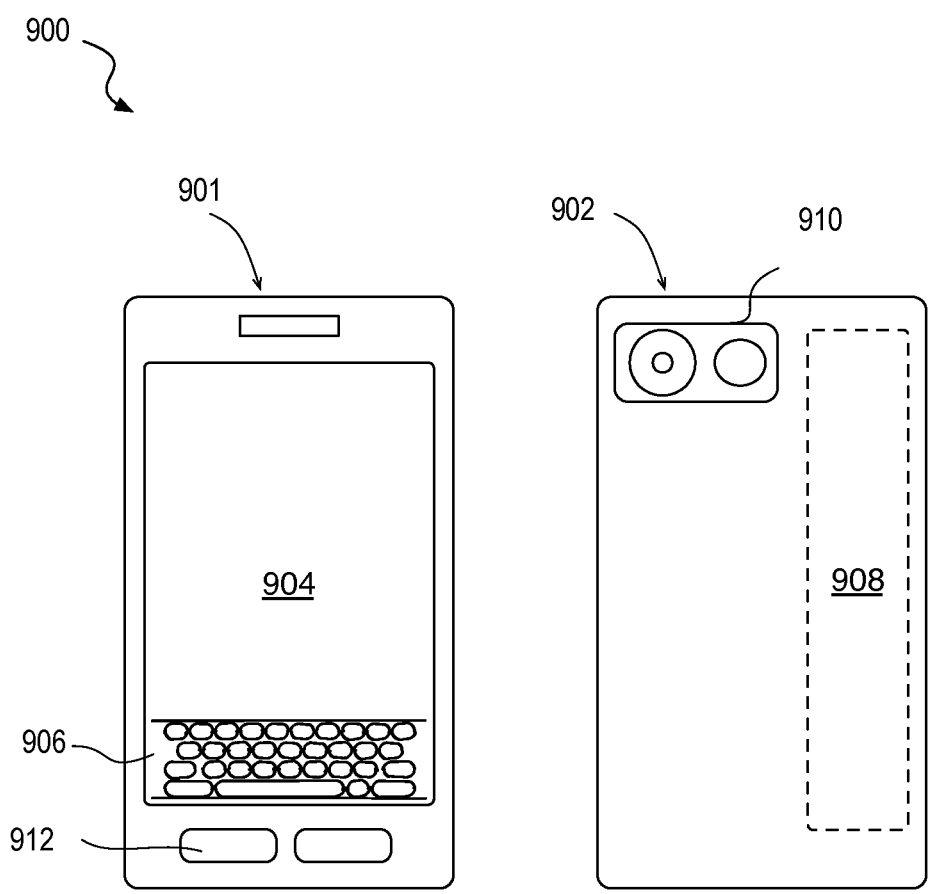
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset device 900 in which platform 802 and/or system 800 may be embodied. In embodiments, for example, device 900 may be implemented as a mobile computing handset device having wireless capabilities. As shown in FIG. 9, mobile handset device 900 may include a housing with a front 901 and back 902. Device 900 includes a display 904, an input/output (I/O) device 906, and an integrated antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. Embodiments are not limited in this context. Integrated into at least the back 902 is a camera module 910 (e.g., including one or more lens, aperture, and imaging sensor), through which image data is sampled and output to a hidden image data decoder, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

The wireless display synchronization control and PTS modification methods comporting with exemplary embodiments described herein may be implemented in various hardware architectures, cell designs, or "IP cores."

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of at least some embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In first embodiments, a video source apparatus comprises a stream multiplexer to assign a presentation timestamp (PTS) to one or more first packets of encoded video data, and to one or more first packets of encoded audio data. The source apparatus further comprises a wireless transmitter coupled to an output of the multiplexer to wirelessly stream the first packets to a paired display device. The source apparatus further comprises a PTS adjustment module coupled to an input of the multiplexer to trigger a PTS modification for one or more second packets of the encoded video and audio data that is responsive to an audio/video (A/V) presentation synchronization error perceived or determined based on an A/V output of the display device rendered from the first packets.

In furtherance of the first embodiments, the PTS adjustment module is to receive a synchronization error signal indicative of the A/V presentation synchronization error, and is further to determine, based on the sync error signal, the PTS modification that counters the A/V presentation synchronization error.

In furtherance of the embodiment immediately above, the PTS adjustment module is to map the synchronization error signal to a predetermined PTS offset value, is to generate a modified PTS value by adding the predetermined PTS offset value to a reference PTS value. The multiplexer is to assign the modified PTS value to one or more of the second packets of the encoded video and audio data.

In furtherance of the first embodiments, the multiplexer is to assign a modified PTS including a PTS offset value to delay presentation of second packets of the encoded video in response to an A/V presentation synchronization error indicative of a lag in audio output relative to video output rendered based on the first packets.

In furtherance of the first embodiments, the apparatus further comprises a sync error user interface to receive a user input indicative of the A/V presentation synchronization error. The PTS adjustment module is to map the user input to a predetermined PTS offset value, and is to generate a modified PTS value by adding the predetermined PTS offset value to a reference PTS value. The multiplexer is to assign a modified PTS including a PTS offset value that is to delay presentation of second packets of the encoded video in response to an A/V presentation synchronization error indicative of a lag in audio output relative to video output rendered based on the first packets. The multiplexer is to assign a modified PTS including a PTS offset value that is to delay presentation of second packets of the encoded audio in response to an A/V presentation synchronization error indicative of a lead in audio output relative to video output rendered based on the first packets.

In furtherance of the first embodiments, the apparatus further comprises a camera module to generate digital video and audio data, as well as a video encoder and audio encoder coupled between an output of the camera module and an input of the multiplexer, the encoders to generate the encoded video and audio data.

In furtherance of the first embodiments, the apparatus further comprises a video encoder and audio encoder coupled to an input of the multiplexer, the encoders to generate the encoded video and audio data. The apparatus further comprises an A/V decoder coupled to an input of the video and audio encoders, wherein the A/V decoder, video encoder, and audio encoder comprise a transcoder to receive a first encoded A/V stream and output second encoded audio and video bit streams.

In one or more second embodiments, a wireless display system includes the video source apparatus of the first embodiments, and a display device to communicate the A/V presentation synchronization error over a back channel maintained between the A/V source device and the display device.

In furtherance of the second embodiments immediately above, the display apparatus further comprises a synchronization error user interface to receive a user input indicative of the A/V presentation synchronization error.

In one or more third embodiments, a wireless video display comprises a wireless receiver to receive a stream of first packets from a paired source device. The display further comprises a de-multiplexer coupled to an output of the wireless receiver, and to de-multiplex a compressed audio data payload from a compressed video data payload, based at least in part, on one or more presentation timestamp (PTS) associated with the first packets. The display further comprises an audio decoder and video decoder coupled to an output of the de-multiplexer, the decoders to generate digital audio and video data. The display further comprises an audio rendering pipeline and video rendering pipeline coupled to the decoders to output an A/V representation of the digital audio and video data. The display further comprises a sync error user interface to receive a user input indicative of a synchronization error in the A/V presentation. The display further comprises a wireless transmitter to communicate an indication of the A/V presentation synchronization error to the paired source device.

In furtherance of the third embodiments, the wireless transmitter is to send the indication of the A/V presentation error over a back channel maintained with the paired source device.

In one or more fourth embodiments, a method for controlling synchronization of audio/video (A/V) presentation by a wireless display comprises assigning a presentation timestamp (PTS) to one or more first packets of encoded video data, and to one or more first packets of encoded audio data. The method further comprises wirelessly streaming the first packets to a paired display device. The method further comprises assigning a display-synchronized PTS to one or more second packets of the encoded video and audio data that is responsive to an audio/video A/V presentation synchronization error perceived or determined based on an A/V output of the display device rendered from the first packets. The method further comprises wirelessly streaming the second packets to the paired display device.

In furtherance of the fourth embodiments, the method further comprises receiving a sync error signal indicative of the A/V presentation synchronization error. The method further comprises determining, based on the sync error signal, the display-synchronized PTS that counters the A/V presentation synchronization error.

In furtherance of the embodiments immediately above, determining the display-synchronized PTS further comprises mapping the sync error signal to a predetermined PTS offset value, generating a modified PTS value by adding the predetermined PTS offset value to a reference PTS value, and assigning the modified PTS value to one or more of the second packets of the encoded video and audio data.

In furtherance of the fourth embodiment, the method further comprises assigning a display-synchronized PTS further comprises assigning a modified PTS including a PTS offset value that delays presentation of second packets of the encoded video in response to an A/V presentation synchronization error indicative of a lag in audio output relative to video output rendered based on the first packets. In the alternative, or additionally, the method further comprises assigning a modified PTS including a PTS offset value that delays presentation of second packets of the encoded audio in response to an A/V presentation synchronization error indicative of a lead in audio output relative to video output rendered based on the first packets.

In furtherance of the fourth embodiment, the method further comprises presenting a synchronization error user interface. The method further comprises receiving, through the synchronization error user interface, a user input indicative of the A/V presentation synchronization error. The method further comprises mapping the user input to a predetermined PTS offset value, generating a modified PTS by adding the predetermined PTS offset value to a reference PTS, and assigning the modified PTS to delay presentation of second packets of the encoded video in response to an A/V presentation synchronization error indicative of a lag in audio output relative to video output rendered based on the first packets, or to delay presentation of second packets of the encoded audio in response to an A/V presentation synchronization error indicative of a lead in audio output relative to video output rendered based on the first packets.

In furtherance of the fourth embodiment, the method further comprises generating the digital video and digital audio data with a camera module including an image sensor, and encoding the digital video and digital audio data into a compressed format.

In furtherance of the fourth embodiment, the method further comprises communicating the A/V presentation synchronization error over a back channel maintained between the A/V source device and the display device.

In one or more fifth embodiments, an apparatus comprises a means to perform any one of the fourth embodiments.

In one or more sixth embodiments, one or more computer readable media includes instruction stored thereon, which when executed by a processing system, cause the system to perform any one of the fourth embodiments.

In one or more seventh embodiments, one or more computer readable media including instruction stored thereon, which when executed by a processing system, cause the system to perform a method comprising assigning a presentation timestamp (PTS) to one or more first packets of encoded video data, and to one or more first packets of encoded audio data, wirelessly streaming the first packets to a paired display device, assigning a display-synchronized PTS to one or more second packets of the encoded video and audio data that is responsive to an audio/video (A/V) presentation synchronization error perceived or determined based on an A/V output of the display device rendered from the first packets, and wirelessly streaming the second packets to the paired display device.

In furtherance of the seventh embodiments, the one or more media further includes instructions stored thereon, which when executed by the processing system, cause the system to perform a method comprising assigning a modified PTS including a PTS offset value that delays presentation of second packets of the encoded video in response to an audio/video (A/V) presentation synchronization error indicative of a lag in audio output relative to video output rendered based on the first packets, and assigning a modified PTS including a PTS offset value that delays presentation of second packets of the encoded audio in response to an audio/video (A/V) presentation synchronization error indicative of a lead in audio output relative to video output rendered based on the first packets.

In one or more eighth embodiment, a method for controlling synchronization of audio/video (A/V) presentation by a wireless display comprises assigning a presentation timestamp (PTS) to one or more first packets of encoded video data, and to one or more first packets of encoded audio data. The method further comprises wirelessly streaming the first packets to a paired display device. The method further comprises assigning a display-synchronized PTS to one or more second packets of the encoded video and audio data that is responsive to an audio/video (A/V) presentation synchronization error perceived or determined based on an A/V output of the display device rendered from the first packets. The method further comprises wirelessly streaming the second packets to the paired display device.

In one or more ninth embodiment, a method for controlling synchronization of audio/video (A/V) presentation by a wireless display comprises wirelessly receiving a stream of first packets from a paired source device. The method further comprises de-multiplexing a compressed audio data payload from a compressed video data payload, based at least in part, on one or more presentation timestamp (PTS) associated the first packets. The method further comprises decoding the compressed audio and video data payloads in digital audio and video data. The method further comprises rendering an A/V representation of the digital audio and video data. The method further comprises receiving a user input indicative of a synchronization error in the A/V presentation. The method further comprises wirelessly transmitting an indication of the A/V presentation synchronization error to the paired source device.

In furtherance of the ninth embodiments immediately above, wirelessly transmitting the indication further comprises sending the indication of the A/V presentation error over a back channel maintained with the paired source device.

In one or more tenth embodiment, one or more computer readable media including instruction stored thereon, which when executed by a processing system, cause the system to perform any one of the ninth embodiments.

In one or more eleventh embodiment, an apparatus includes a means to perform any one of the ninth embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A video source apparatus, comprising:
   a stream multiplexer to assign a presentation timestamp (PTS) to one or more first packets of encoded video data, and to one or more first packets of encoded audio data;
   a wireless transmitter coupled to an output of the multiplexer to wirelessly stream the first packets to a paired display device; and
   a PTS adjustment module coupled to an input of the multiplexer to trigger a PTS modification for one or more second packets of the encoded video and audio data that is responsive to an audio/video (A/V) presentation synchronization error perceived or determined based on an A/V output of the display device rendered from the first packets.

2. The apparatus of claim 1, wherein the PTS adjustment module is to:
receive a synchronization error signal indicative of the A/V presentation synchronization error; and
determine, based on the synchronization error signal, the PTS modification that counters the A/V presentation synchronization error.

3. The apparatus of claim 2, wherein:
the PTS adjustment module is to:
map the synchronization error signal to a predetermined PTS offset value;
generate a modified PTS value by adding the predetermined PTS offset value to a reference PTS value; and
the multiplexer is to assign the modified PTS value to one or more of the second packets of the encoded video and audio data.

4. The apparatus of claim 2, wherein:
the multiplexer is to assign a modified PTS including a PTS offset value to delay presentation of second packets of the encoded video in response to an A/V presentation synchronization error indicative of a lag in audio output relative to video output rendered based on the first packets.

5. The apparatus of claim 1, further comprising:
a synchronization error user interface to receive a user input indicative of the A/V presentation synchronization error; and
wherein the PTS adjustment module is to:
map the user input to a predetermined PTS offset value;
generate a modified PTS value by adding the predetermined PTS offset value to a reference PTS value; and
wherein the multiplexer is to:
assign a modified PTS based on a PTS offset value that is to delay presentation of second packets of the encoded video in response to an A/V presentation synchronization error indicative of a lag in audio output relative to video output rendered based on the first packets; and
assign a modified PTS based on a PTS offset value that is to delay presentation of second packets of the encoded audio in response to an A/V presentation synchronization error indicative of a lead in audio output relative to video output rendered based on the first packets.

6. The apparatus of claim 1, further comprising:
a camera module to generate digital video and audio data;
a video encoder and audio encoder coupled between an output of the camera module and an input of the multiplexer, the encoders to generate the encoded video and audio data.

7. The apparatus of claim 1, further comprising:
a video encoder and audio encoder coupled to an input of the multiplexer, the encoders to generate the encoded video and audio data;
an A/V decoder coupled to an input of the video and audio encoders, wherein the A/V decoder, video encoder, and audio encoder comprise a transcoder to receive a first encoded A/V stream and output second encoded audio and video bit streams.

8. A wireless display system, comprising:
the video source apparatus of claim 1; and
a display device to communicate the A/V presentation synchronization error over a back channel maintained between the A/V source device and the display device.

9. The wireless display system of claim 8, wherein the display apparatus further comprises a synchronization error user interface to receive a user input indicative of the A/V presentation synchronization error.

10. A wireless video display, comprising:
a wireless receiver to receive a stream of first packets from a paired source device;
a de-multiplexer coupled to an output of the wireless receiver, and to de-multiplex a compressed audio data payload from a compressed video data payload, based at least in part, on one or more presentation timestamp (PTS) associated with the first packets;
an audio decoder and video decoder coupled to an output of the de-multiplexer, the decoders to generate digital audio and video data;
an audio rendering pipeline and video rendering pipeline coupled to the decoders to output an audio/visual (A/V) representation of the digital audio and video data;
a synchronization error user interface to receive a user input indicative of a synchronization error in the A/V presentation; and
a wireless transmitter to communicate an indication of the A/V presentation synchronization error to the paired source device.

11. The display of claim 10, wherein the wireless transmitter is to send a signal indicative of the A/V presentation error over a back channel maintained with the paired source device.

12. A method for controlling synchronization of audio/video (A/V) presentation by a wireless display, the method comprising:
assigning a presentation timestamp (PTS) to one or more first packets of encoded video data, and to one or more first packets of encoded audio data;
wirelessly streaming the first packets to a paired display device;
assigning a display-synchronized PTS to one or more second packets of the encoded video and audio data that is responsive to an A/V presentation synchronization error perceived or determined based on an A/V output of the display device rendered from the first packets; and
wirelessly streaming the second packets to the paired display device.

13. The method of claim 12, further comprising:
receiving a synchronization error signal indicative of the A/V presentation synchronization error; and
determining, based on the synchronization error signal, the display-synchronized PTS that counters the A/V presentation synchronization error.

14. The method of claim 13, wherein determining the display-synchronized PTS further comprises:
mapping the synchronization error signal to a predetermined PTS offset value;
generating a modified PTS value by adding the predetermined PTS offset value to a reference PTS value; and
assigning the modified PTS value to one or more of the second packets of the encoded video and audio data associated with the reference PTS value.

15. The method of claim 12, wherein assigning a display-synchronized PTS further comprises:
assigning a modified PTS based on a PTS offset value that delays presentation of second packets of the encoded video in response to an A/V presentation synchronization error indicative of a lag in audio output relative to video output rendered based on the first packets; and assigning a modified PTS based on a PTS offset value that delays presentation of second packets of the encoded audio in response to an A/V presentation synchronization error indicative of a lead in audio output relative to video output rendered based on the first packets.

16. The method of claim 12, further comprising:

presenting a synchronization error user interface;

receiving, through the synchronization error user interface, a user input indicative of the A/V presentation synchronization error;

mapping the user input to a predetermined PTS offset value;

generating a modified PTS by adding the predetermined PTS offset value to a reference PTS; and assigning the modified PTS to delay presentation of second packets of the encoded video in response to an A/V presentation synchronization error indicative of a lag in audio output relative to video output rendered based on the first packets, or to delay presentation of second packets of the encoded audio in response to an A/V presentation synchronization error indicative of a lead in audio output relative to video output rendered based on the first packets.

17. The method of claim 12, further comprising:

generating the digital video and digital audio data with a camera module including an image sensor;

and encoding the digital video and digital audio data into a compressed format.

18. The method of claim 12, further comprising:

communicating the A/V presentation synchronization error over a back channel maintained between the A/V source device and the display device.

19. One or more non-transitory computer readable media including instruction stored thereon, which when executed by a processing system, cause the system to perform a method comprising:

assigning a presentation timestamp (PTS) to one or more first packets of encoded video data, and to one or more first packets of encoded audio data;

wirelessly streaming the first packets to a paired display device;

assigning a display-synchronized PTS to one or more second packets of the encoded video and audio data that is responsive to an audio/video (A/V) presentation synchronization error perceived or determined based on an A/V output of the display device rendered from the first packets; and wirelessly streaming the second packets to the paired display device.

20. The media of claim 19, further including instructions stored thereon, which when executed by the processing system, cause the system to perform a method comprising:

assigning a modified PTS based on a PTS offset value that delays presentation of second packets of the encoded video in response to an A/V presentation synchronization error indicative of a lag in audio output relative to video output rendered based on the first packets; and assigning a modified PTS based on a PTS offset value that delays presentation of second packets of the encoded audio in response to an A/V presentation synchronization error indicative of a lead in audio output relative to video output rendered based on the first packets.

21. A method for controlling synchronization of audio/video (A/V) presentation by a wireless display, the method comprising:

wirelessly receiving a stream of first packets from a paired source device;

de-multiplexing a compressed audio data payload from a compressed video data payload, based at least in part, on one or more presentation timestamp (PTS) associated the first packets;

decoding the compressed audio and video data payloads into digital audio and video data;

rendering an A/V representation of the digital audio and video data;

receiving a user input indicative of a synchronization error in the A/V presentation; and wirelessly transmitting an indication of the A/V presentation synchronization error to the paired source device.

22. The method of claim 21, wherein wirelessly transmitting the indication further comprises sending a signal indicative of the A/V presentation error over a back channel maintained with the paired source device.

* * * * *